United States Patent [19]

Najjar et al.

[11] Patent Number: 4,808,386
[45] Date of Patent: Feb. 28, 1989

[54] PARTIAL OXIDATION OF SULFUR-CONTAINING SOLID CARBONACEOUS FUEL

[75] Inventors: Mitri S. Najjar, Hopewell Junction; Roger J. Corbeels, Wappingers Falls, both of N.Y.

[73] Assignee: Texaco Inc., White Plains, N.Y.

[21] Appl. No.: 100,673

[22] Filed: Sep. 24, 1987

Related U.S. Application Data

[63] Continuation-in-part of Ser. No. 20,307, Mar. 2, 1987, which is a continuation-in-part of Ser. No. 62,018, Jun. 15, 1987.

[51] Int. Cl.$^4$ .......................... B01D 53/34; C10J 3/46
[52] U.S. Cl. .............................. 423/226; 48/197 FM; 48/201; 48/202; 48/210; 252/373; 423/230; 423/231
[58] Field of Search ............... 423/220, 226, 230, 231, 423/415 A, 648 R; 48/197 FM, 201, 200, 202, 210; 252/373

[56] References Cited

U.S. PATENT DOCUMENTS

| | | | |
|---|---|---|---|
| 2,987,386 | 6/1961 | Chapman et al. | 423/415 A |
| 3,977,844 | 8/1976 | Van Slyke | 252/373 |
| 4,007,018 | 2/1977 | Slater et al. | 48/215 |
| 4,026,679 | 5/1977 | Collin | 252/373 |
| 4,123,502 | 10/1978 | Holter et al. | 423/231 |
| 4,273,749 | 6/1981 | Kimura et al. | 423/231 |
| 4,328,008 | 5/1982 | Muenger et al. | 48/206 |
| 4,370,161 | 1/1983 | Turkdogan | 423/230 |
| 4,598,652 | 7/1986 | Hepworth | 44/604 |

FOREIGN PATENT DOCUMENTS

54202  5/1978  Japan .................................. 48/201

Primary Examiner—Robert L. Stoll
Assistant Examiner—Jeffrey Edwin Russel
Attorney, Agent, or Firm—Robert A. Kulason; James J. O'Loughlin; Albert Brent

[57] ABSTRACT

A process for the simultaneous partial oxidation and desulfurization of an ash-containing solid carbonaceous fuel comprising (basis solid fuel) 0.2 to 8.0 wt. % sulfur and 0.1 to 30 wt. % of silicate compounds for the production of gaseous mixtures comprising $H_2$ and CO and entrained molten slag. In the process, the solid carbonaceous fuel and supplemental iron-containing material are reacted by partial oxidation in the reaction zone of a free-flow unobstructed down-flowing vertical refractory lined gas generator with a controlled amount free-oxygen containing gas and a temperature moderator so that an equilibrium oxygen concentration is provided in the gas phase in the reaction zone having a partial pressure which is less than about $10^{-7}$ atmospheres. The partial oxidation and desulfurization reactions take place simultaneously at a temperature which is above 1900° F. and about 10° to 200° F. above the fluid temperature of the slag at an increased thermal efficiency. The sulfur in the solid carbonaceous fuel in the reaction zone is converted into iron oxysulfide particulate matter which leaves the reaction zone along with the silicates of calcium and iron in the molten ash that is entrained in the hot raw effluent gas stream comprising $H_2$ and CO. Less than about 0.6 mole % of $H_2S$ and COS is in the effluent gas stream. Additional desulfurization in a fluidized bed of calcium and carbon containing materials may be optionally used to reduce the mole % of $H_2S$ and COS.

25 Claims, No Drawings

PARTIAL OXIDATION OF SULFUR-CONTAINING SOLID CARBONACEOUS FUEL

This is a continuation-in-part of copending application Ser. No. 0 20,307, filed Mar. 2, 1987, and copending application Ser. No. 0 62,018, filed June 15, 1987.

FIELD OF THE INVENTION

This invention pertains to the simultaneous partial oxidation and desulfurization of a sulfur and silicate-containing solid carbonaceous fuel. More particularly, it pertains to a process for the partial oxidation of a sulfur and silicate-containing carbonaceous fuel for the production of gaseous mixtures comprising $H_2$ and CO and containing less than about 0.05 volume % of $H_2S$ and COS.

It would be highly desirable to use comparatively low-cost readily available sulfur and silicate-containing solid carbonaceous fuels such as coal, lignite, petroleum coke and mixtures thereof for the production of gaseous mixtures comprising $H_2+CO$. These gaseous mixtures are commonly known as synthesis gas, reducing gas, and fuel gas depending on the actual gaseous composition. For example synthesis gas comprises a specific $H_2/CO$ mole ratio, reducing gas has a high reducing ratio e.g. $H_2+CO/H_2O+CO_2$, and fuel gas contains supplemental $CH_4$ and has a relatively high heat content.

By conventional partial oxidation gasification processes, sulfur containing gases e.g. $H_2S$ and COS in the amount of about 0.1 to 2.0 mole % are produced along with the $H_2+CO$. These sulfur-containing gaseous impurities are undesirable. They corrode piping and equipment upon contact; and, they deactivate catalysts. Accordingly, raw gas streams from the reaction zone may require additional downstream gas purification in order to remove the sulfur-containing gases.

The need for means to remove a major portion of the sulfur in synthesis gas as generated by the partial oxidation process is widely recognized. In particular, removal of sulfur from synthesis gas at high temperature is of great interest. The combined-cycle thermal efficiency is improved by eliminating the need to cool the product gases prior to low-temperature acid-gas wet scrubbing. Gaseous impurities, including $H_2S$, COS and $CO_2$ are removed from raw synthesis gas by low temperature condensation and by solvent absorption in a separate gas purification operation located downstream from the gas generator in coassigned U.S. Pat. No. 4,052,176. Further, in this process, it is necessary to cool the hot raw gas stream from a temperature of 2700° F. to −70° F. before the sulfur-containing gas are separated. Advantageously, the subject invention described herein employs a vertical free-flow unobstructed refractory lined generator operating in the slagging mode and in an extremely reducing atmosphere. The hot effluent gas stream is desulfurized with substantially no reduction in temperature. Further, the life of the refractory lining in the gas generator is increased. Also, iron is tied up in the molten ash as iron silicates and sulfides; and substantially no elemental iron, e.g. not more than 5.0 wt. % of the slag is produced.

SUMMARY OF THE INVENTION

This invention relates to a process for the production of gaseous mixtures comprising $H_2+CO$ and containing a reduced amount of sulfur-containing gases e.g. $H_2S+COS$ by the simultaneous partial oxidation and desulfurization of a sulfur and silicate-containing comminuted solid carbonaceous fuel. In addition to carbon, the solid carbonaceous fuel comprises (basis solid fuel) about 0.2 to 8.0 wt. % sulfur and about 0.1 to 30 wt. % silicate compounds including iron silicate. An additional gas desulfurization step in a fluidized bed located downstream from the gas generator is provided in one embodiment of the subject invention. The fluidized bed contains a calcium-containing material and a carbon-containing material.

In the process, a sulfur and silicate-containing solid carbonaceous fuel and a supplemental iron-containing material are reacted by partial oxidation in the reaction zone of a free-flow unobstructed down-flowing vertical refractory lined gas generator with a controlled amount of free-oxygen containing gas and a temperature moderator so that an equilibrium oxygen concentration is produced in the gas phase in the reaction zone having a partial pressure which is less than about $10^{-7}$ atmosphere. The O/C atomic ratio is in the range of about 0.5 to 1.3. The $H_2O$/solid carbonaceous fuel weight ratio is in the range of about 0.2 to 1.0. Further, the total atoms of iron in the reaction zone is in the range of about 1.3 to 3.0 times the atoms of sulfur in the solid carbonaceous fuel plus about 0.5 to 2.0 times the atoms of silicon in the ash. The partial oxidation and desulfurization reactions take place simultaneously at a temperature which is about 1900° F. and about 10° to 100° F. above the fluid temperature of the slag which has a viscosity in the range of about 1.0 to 2000 poises. The pressure in the reaction zone is in the range of about 2 to 250 atmospheres. Substantially not more than 5.0 wt. % of the slag comprises elemental iron and about 70 to 99.8 wt. % of the carbon in the original solid carbonaceous fuel is converted into carbon oxides e.g. CO and $CO_2$. There is substantially no formation of additional calcium silicates in the reaction zone of the partial oxidation gas generator from the silicates in said solid carbonaceous fuel feed. Further, at least 30 wt.% of the sulfur in the solid carbonaceous fuel in the reaction zone is converted into iron oxysulfide particulate matter which leave the reaction zone along with the silicates of calcium in said molten slag. By definition iron oxysulfide is iron sulfide in solution with iron oxide. The iron sulfide may be present in the solution in the range of about 10 to 99 wt. %, and the remainder may comprise iron oxide. Further, the mole % $H_2S+COS$ in the effluent gas stream from the gas generator is reduced from a mole % of about 0.10 to 2.0 to less than about 0.05 mole % by the subject process. The molten slag is entrained in the hot raw effluent gas stream comprising $H_2$, CO, $CO_2$, at least one gas selected from the group consisting of $H_2O$, $N_2$, $NH_3$, $CH_4$ $H_2S$, COS and A; and entrained molten slag including calcium sulfide, iron oxysulfide, and the silicates of calcium and iron. The hot desulfurized gas stream is cooled and cleaned by conventional means.

DISCLOSURE OF THE INVENTION

This invention relates to the partial oxidation of sulfur and silicate-containing solid carbonaceous fuels such as coal and petroleum coke, or mixtures thereof to produce synthesis gas, reducing gas, or fuel gas which is substantially free from sulfur. More particularly, it pertains to a partial oxidation process employing an additive system for in situ capturing the sulfur from the fuel at high temperature, and to a special gasifier operating mode to maximize the effectiveness of the additive. In the case of petroleum coke feedstocks, the additive system will also help with the removal of vanadium and nickel contaminants from the gasifier.

From the point of view of thermodynamics and cost, the addition of supplemental iron-containing compounds to the partial oxidation gasifier has been found to be highly effective to capture the sulfur contained in sulfur and silicate-containing solid carbonaceous fuels. Thermodynamics favor iron, especially at low gasification temperatures, e.g. above about 1900° F. and about 10° to 100° F. above the fluid temperature of the slag. However, the syngas produced must have a sufficiently low oxygen potential for iron to capture the sulfur. To produce a syngas with sufficiently low oxygen potential, the following methods of feeding may be used in the subject process: (1) gas-entrained feeding of solid carbonaceous fuel particulates; and (2) liquid hydrocarbonaceous fuel, liquid $CO_2$ or water slurry feeding with skimming of any $CO_2$ or $H_2O$ carrier. It has been found that by the subject process, a smaller amount of calcium is tied up in the silicate slag. Large amounts of the silicates of calcium adversely affect the slag viscosity, especially if elemental iron is also present.

The sulfur and silicate-containing solid carbonaceous fuel feed materials in the subject process include by definition coal e.g. anthracite, bituminous, subbituminous, lignite, coke made from coal; petroleum coke; oil shale; tar sands; pitch; and mixtures thereof. In addition to carbon, solid carbonaceous fuel comprises (basis solid fuel) about 0.2 to 8.0 wt. % of sulfur and about 0.1 to 30 wt. % of silicate compounds including iron silicate. The solid carbonaceous fuels are preferably ground to a particle size so that 100% of the material passes through an ASTM E 11-70 Sieve Designation Standard 1.4 mm (Alternative No. 14) and at least 80% passes through an ASTM E 11-70 Sieve Designation Standard 425 um (Alternative No. 40). The moisture content of the solid carbonaceous fuel particles is in the range of about 0 to 10 wt. %, such as 2 to 5 wt. %. The feedstock may be dried when necessary.

The ground solid carbonaceous fuel is mixed with the iron-containing material. The two materials may be ground together, or separately ground and then mixed. The iron-containing material is introduced to react with the sulfur-containing materials in the reaction zone to produce iron oxysulfide thereby reducing the formation of sulfur-containing gases e.g. $H_2S$ and COS. The iron-containing material is selected from the group consisting of elemental iron, iron compounds selected from the group consisting of oxides, carbonates, cyanides, carbonyl, chlorides, nitrates, and mixtures thereof. Iron oxide is the preferred type of iron-containing material. Further, the iron-containing portion of the supplemental iron-containing material may be a water soluble iron salt. In one embodiment, the supplemental iron-containing material is a ferro or ferri organic compound selected from the group consisting of naphthenates, oxalates, acetates, citrates, benzoates, oleates, tartrates, and mixtures thereof. The iron-containing material may be mixed with the solid carbonaceous fuel before, during or after the solid carbonaceous fuel is ground. Sufficient supplemental iron-containing materials are introduced so that the total amount of iron in the reaction zone comprising the atoms of iron in the solid fuel and the atoms of iron in the supplemental iron-containing material is in the range of about 1.3 to 3.0 times the atoms of sulfur in the solid carbonaceous fuel plus about 0.5 to 2.0 times the atoms of silicon in the ash.

The solid carbonaceous fuel in admixture with the supplemental iron-containing material is introduced into the reaction zone of a vertical refractory-lined, unobstructed, free-flow, down-flowing, noncatalytic, partial oxidation gas generator by way of a burner. Simultaneously, a stream of free-oxygen containing gas and a temperature moderator are introduced into the gas generator. Single and double annulus type of burners for introducing the feedstreams into the partial oxidation gas generator are shown in coassigned U.S. Pat. Nos. 3,528,930 and 3,847,564, which are incorporated herein by reference. Typical partial oxidation gas generating processes employing gaseous and liquid $CO_2$-solid carbonaceous fuel feeds are shown in coassigned U.S. Pat. Nos. 3,976,442, and 3,976,443 respectively, and are incorporated herein by reference.

The mixture of solid carbonaceous fuel and iron-containing. material may be introduced in the partial oxidation reaction zone as solid particles entrained in a gaseous medium e.g. steam, nitrogen, $H_2O$, $CO_2$, recycle synthesis gas, free-oxygen containing gas, and mixtures thereof. Alternatively, pumpable slurries of said mixture of solid carbonaceous fuel and iron-containing material in a liquid carrier comprising a liquid hydrocarbonaceous fuel water or liquid $CO_2$ may be introduced into the gas generator. For example, the liquid slurry may comprise 50-70 wt, % of solid carbonaceous fuel and iron-containing material and the remainder is liquid $H_2O$ or $CO_2$. At least a portion of the $H_2O$ or $CO_2$ may be skimmed from the $H_2O$ or $CO_2$-solid fuel mixture prior to the mixture being introduced into the burner at a temperature in the range of about $-67°$ F. to 100° F. depending on the pressure. After skimming, the mixture of solid carbonaceous fuel, ironcontaining material, and $H_2O$ or $CO_2$ contains about 5 to 10, say about 10 to 20 wt. % of $H_2O$ or $CO_2$ (basis weight of feed). In another embodiment, the feedstream comprises a slurry of liquid hydrocarbonaceous material, solid carbonaceous fuel, and iron-containing material.

The term liquid hydrocarbonaceous material as used herein to describe suitable liquid carriers is intended to include various materials, such as liquified petroleum gas, petroleum distillates and residues, gasoline, naphtha, kerosene, crude petroleum, asphalt, gas oil, residual oil, tar sand oil, shale oil, coal derived oil, aromatic hydrocarbon (such as benzene, toluene, xylene fractions), coal tar, cycle gas oil from fluid-catalytic-cracking operation, furfural extract of coker gas oil, methanol, ethanol and other alcohols, by-product oxygen containing liquid hydrocarbons from oxo or oxyl synthesis, and mixtures thereof.

The partial oxidation reaction takes place in the reaction zone of the gas generator at a temperature which is above about 1900° F. and about 10° to 200° F. above the fluid temperature of the slag which has a viscosity in the range of about 1.0 to 2000 poises. The pressure in the reaction zone is in the range of about 2 to 250 atmospheres, say 10 to 100 atmospheres. The atoms of free-oxygen plus atoms of organically combined oxygen in the solid carbonaceous fuel per atom of carbon in the solid carbonaceous fuel (O/C atomic ratio) may be in the range of 0.5 to 1.3. The free-oxygen is intended to include air, oxygen-enriched air, i.e., greater than 21 mole % oxygen, and substantially pure oxygen, i.e. greater than 95 mole % oxygen. (the remainder comprising $N_2$ and rare gases). The weight ratio $H_2O$/solid carbonaceous fuel in the reaction zone is in the range of about 0.2 to 1.0. The free-oxygen containing gas and temperature moderator are provided in a controlled amount so that an equilibrium oxygen concentration is provided in the gas phase in the reaction zone having a partial pressure which is less than about $10^{-7}$ atmosphere.

The raw product gas leaving the reaction zone may have the following composition in mole percent: $H_2$ 8 to 60, CO 8 to 70, $CO_2$ 1 to 20, $H_2O$ 1 to 40, $CH_4$ nil to 30, $H_2S+COS$ less than about 0.6, $N_2$ nil to 85 and A nil to 2.0. Molten slag is entrained in the hot raw effluent gas stream from the reaction zone.

Substantially no elemental iron, e.g. not more than 5.0 wt. % of the slag, is reduced in the reaction zone; there is substantially no formation of additional calcium silicates; and about 70 to 99.8 wt. % of the carbon in the original solid carbonaceous fuel is converted into carbon oxides e.g. $CO+CO_2$. About 70 to 90 volume % of the carbon oxides comprises CO. About 10 to 99 wt. % of the sulfur in the solid carbonaceous fuel in the reaction zone is converted into iron oxysulfide particulate matter which leaves the reaction zone along with the molten slag entrained in the hot raw effluent gas stream. The remainder of the sulfur is converted into the sulfur-containing gaseous products e.g. $H_2S$ and COS. By definition, molten slag is the molten remnant of particles of the solid carbonaceous fuel which have been subjected to partial oxidation at a temperature above about 1900° F. It substantially comprises the fused reaction products of the supplemental iron-containing material and the mineral matter found originally in the solid carbonaceous fuel. On a dry basis, the slag may comprise in wt. %: $SiO_2$ 10 to 50, $Al_2O_3$ 10 to 50, iron oxysulfide 10 to 50, calcium oxides and sulfides 5 to 70, the silicates of calcium and iron 5 to 70, and others. The slag particles in the bottom of the quench tank has a size in the range of about 0.001 to 6 inches.

In one embodiment, the hot raw effluent gas stream from the partial oxidation reaction may be cooled and cleaned by contact with a liquid hydrocarbonaceous fuel cooling and scrubbing agent in a conventional gas quench tank and/or in gas scrubbing equipment. For example, reference is made to co-assigned U.S. Pat. No. 4,007,018, which is incorporated herein by reference. A slurry of slag in liquid hydrocarbonaceous fuel is produced. After being steam stripped and separating $H_2S$; the sulfur-depleted slurry may be recycled to the front end of the process. There it is mixed with fresh sulfur and silicate containing solid carbonaceous fuel and make-up iron-containing material in the preparation of fresh feed mixture to the partial oxidation gas generator. The gaseous mixture of steam and $H_2S$ is then sent to a conventional sulfur-recovery facility; for example, a conventional Claus unit. In this embodiment, water was avoided as the cooling and scrubbing agent for the hot raw effluent gas stream from the gas generator in order to prevent the iron oxysulfide entrained in the hot raw effluent gas stream from reacting with the water to produce unwanted $H_2S$ in the product gas. In another embodiment, the slag is separated from the cooling and scrubbing agent by conventional methods e.g. settling, screening, and filtration. The cooling and scrubbing agent may be then recycled, and the slag may be used as fill.

If necessary, further desulfurization of the raw effluent gas stream leaving the gas quench tank or gas scrubber may take place in a fluidized bed comprising 85 to 99 wt. % of a calcium-containing material and the remainder comprising a carbon-containing material. The $H_2S+COS$ content in the raw effluent product gas stream may be thereby reduced to less than about 0.05 mole %. The calcium -containing material is selected from the group of calcium-compounds consisting of oxides, hydroxide, carbonates, acetate, formate, hydride, nitrate, chloride, and mixtures thereof. The carbon-containing material is selected from the group consisting of carbon, coal, petroleum coke, soot, carbonaceous particles that were entrained in the raw effluent gas stream from the partial oxidation reaction zone, and mixtures thereof. The fluidized bed may be regenerated by steam stripping. The overhead steam stripped gaseous stream comprising $H_2O$, $H_2S$ and COS may be sent to a conventional Claus Unit where elemental sulfur is produced.

In still another embodiment, the hot raw effluent gas stream from the reaction zone is split into first and second gas streams, such as in the manner described in coassigned U.S. Pat. No. 4,328,008, which is incorporated herein by reference. The first gas stream is cooled by indirect heat exchange with a coolant in a gas cooler and contains about 60 to 99.5 volume %, such as about 80 to 99 vol. % of the total hot raw effluent gas stream leaving the reaction zone of the partial oxidation gas generator. The first stream also contains less than about 10 wt. % of the entrained molten slag and particulate matter, e.g. about 0.1 to 6.0 wt. %. The second split stream of raw synthesis gas includes the remainder of the slag, particulate matter, and sulfur-containing material from the reaction zone. The first split stream of raw synthesis gas, preferably at substantially the same temperature and pressure as in the reaction zone less ordinary drops in the lines, is passed through a fluidized bed of calcium-containing material and carbon-containing material, thereby reducing the amount of sulfur-containing materials in the first split gas stream. It was unexpectedly found that the addition of a carbon-containing material to the fluidized bed was necessary in order to generate a highly reducing atmosphere in the fluidized bed. Under these reducing conditions the capture of substantially all of the remaining sulfur-containing gases in the process gas stream was effected. By means of the carbon-containing material a localized reducing atmosphere was generated around the calcium-containing absorbent material. Optionally, prior to being introduced into said fluidized bed, the first split gas stream may be cooled to a temperature in the range of about 1000° F. to 2200° F. by indirect heat exchange. Steam may be produced thereby. The second split gas stream is passed through a pool of quench fluid contained in a quench tank. When the quench fluid is water, most of the calcium sulfide and some of the iron oxysulfide in the slag in the second gas stream react with the quench water to produce $H_2S$. The second split gas stream containing said supplemental $H_2S$ leaves the quench tank and may be desulfurized. For example, the $H_2S$-enriched gas stream may be introduced into a conventional Claus Unit where elemental sulfur is produced. In a Claus Unit, a portion of the $H_2S$ in the $H_2S$-containing gas is burned with air to produce water and $SO_2$. A shift reaction then occurs between $SO_2$ and the remainder of the $H_2S$ to produce elemental sulfur and $H_2O$. The tail gas from the Claus unit is processed to a concentration of about 200 ppm of $H_2S$ and $SO_2$. Since the slag remaining in the bottom of the quench tank contains a reduced amount of sulfur, the slag is less hazardous. Further, any cost to pretreat the slag prior to disposal is thereby reduced.

In another embodiment, the desulfurized first split stream of synthesis gas leaving the aforesaid calcium and carbon-containing fluidized bed is cooled and scrubbed by direct contact with water in a gas cooling and scrubbing zone. Any sulfides of calcium and iron remaining in the first split gas stream react with the water to produce supplemental $H_2S$. The first split gas stream containing said supplemental $H_2S$ leaving the gas cooling and scrubbing zone is then sent to a conventional desulfurization zone where acid gases are removed, for example by a solvent absorbent.

Alternatively, the first split gas stream may be cooled by indirect heat exchange with a coolant before the gas scrubbing step. For example, the first split gas stream may be passed through a waste heat boiler to produce steam and then scrubbed with a liquid hydrocarbonaceous fuel.

In another embodiment, the hot raw gas stream produced in the free-flow unobstructed down-flowing vertical refractory lined reaction zone is discharged through a central outlet in the bottom of said reaction zone. Simultaneously, at least one stream of oxidizing gas is directed at said orifice and the hot raw gas stream passing through. By this means, at least a portion of any elemental iron in the molten slag entrained in said hot raw effluent gas stream and/or on the walls of said outlet is oxidized. The oxidizing gas may be selected from the group consisting of steam, a free-oxygen containing gas, and mixtures thereof. The free-oxygen containing gas may be selected from the group consisting of air, oxygen-enriched air i.e. greater than 21 mole % $O_2$, oxygen enriched nitrogen or $CO_2$ i.e. greater than 1 mole % $O_2$, and substantially pure oxygen i.e. greater than 95 mole % $O_2$.

Other modifications and variations of the invention as hereinbefore set forth may be made without departing from the spirit and scope thereof, and therefore only such limitations should be imposed on the invention as are indicated in the appended claims.

We claim:

1. In a process for the simultaneous partial oxidation and desulfurization of a sulfur and silicate-containing comminuted solid carbonaceous fuel comprising (basis solid fuel) about 0.2 to 8.0 wt. % sulfur and about 0.1 to 30 wt. % of silicate compounds including iron silicate and calcium silicate the improvement comprising: (1) reacting in the free-flow unobstructed down-flowing vertical refractory lined reaction zone of a partial oxidation gas generator a feed mixture comprising said solid carbonaceous fuel entrained in a gaseous or liquid carrier and supplemental iron-containing material with a controlled amount of free-oxygen containing gas and a temperature moderator so that an equilibrium oxygen concentration is provided in the gas phase in the reaction zone with a partial pressure which is less than about $10^{-7}$ atmosphere, the O/C atomic ratio is in the range of about 0.5 to 1.3, the $H_2O$/solid carbonaceous fuel weight ratio in the range of about 0.2 to 1.0, the total atoms of iron in the reaction zone is in the range of about 1.3 to 3.0 times the atoms of sulfur in the solid carbonaceous fuel plus about 0.5 to 2.0 times the atoms of silicon in the ash, and about 70 to 99.8 wt. % of the carbon in said solid carbonaceous fuel is converted into carbon oxides; thereby producing a raw effluent gas mixture which is discharged through a central vertical outlet in the bottom of said reaction zone, said effluent gas stream comprising $H_2$, CO, $CO_2$, at least one gas selected from the group consisting of $H_2O$, $N_2$, $CH_4$, and A, less than about 0.6 mole % of $H_2S+COS$, and entrained molten slag in admixture with iron oxysulfide particulate matter and the silicates of calcium and iron; wherein the partial oxidation and desulfurization reactions take place at a temperature which is above 1900° F. and which is about 10° to 200° F. above the fluid temperature of the slag and at a pressure in the range of about 2 to 250 atmospheres; and wherein substantially not more than 5.0 wt. % of the slag comprises elemental iron; and there is substantially no formation of additional calcium silicates in the gas generator from the silicates in said solid carbonaceous fuel, and at least 30 wt. % of the sulfur in the solid carbonaceous fuel in the reaction zone is converted into said iron-oxysulfide particulate matter which leaves the reaction zone along with said molten slag; and (2) cooling and cleaning the hot raw gas from (1).

2. The process of claim 1 wherein said sulfur and silicate-containing solid carbonaceous fuel is selected from the group consisting of coal coke made from coal; petroleum coke; oil shale; tar sands; pitch; and mixtures thereof.

3. The process of claim 1 wherein said supplemental iron-containing material is selected from the group consisting of elemental iron, iron compounds selected from the group consisting of oxides, carbonates, cyanides, carbonyl, chlorides, nitrates, and mixtures thereof.

4. The process of claim 1 wherein the iron containing portion of said supplemental iron-containing material is a ferro or ferri organic compound selected from the group consisting of naphthenates, oxalates, acetates, citrates, benzoates, oleates, tartrates, and mixtures thereof.

5. The process of claim 1 wherein the iron containing portion of said supplemental iron-containing material is a water soluble iron salt.

6. The process of claim 1 wherein said mixture of solid carbonaceous fuel and supplemental iron-containing material is introduced downwardly into said reaction zone as entrained in a gaseous or liquid mixture.

7. The process of claim 1 wherein said solid carbonaceous fuel and supplemental iron-containing material are introduced into the reaction zone as a slurry in a liquid hydrocarbonaceous fuel or water.

8. The process of claim 1 wherein said mixture of solid carbonaceous fuel and supplemental iron-containing material comprises a pumpable liquid slurry having a solids content of about 50–70 wt. % in a liquid carrier selected from the group consisting of liquid hydrocarbonaceous fuel, $H_2O$ and $CO_2$; and when said carrier is $H_2O$ or $CO_2$, prior to said mixture entering the reaction zone reducing the amount of carrier entering the gas generator to about 5 to 20 wt. % (basis weight of feed).

9. The process of claim 1 provided with the steps of cooling and cleaning the hot raw gas mixture in (2) by contacting all of said hot raw product gas mixture with a liquid hydrocarbonaceous fuel cooling and scrubbing agent thereby producing a slurry comprising slag and iron oxysulfide in a liquid hydrocarbonaceous fuel.

10. The process of claim 9 provided with the steps of steam stripping said slurry and separating a gaseous mixture comprising steam and $H_2S$, and recycling the sulfur-depleted slurry to the front end of the process for use in preparation of fresh feed mixture to the partial oxidation gas generator.

11. The process of claim 10 provided with the step of recovering sulfur from the mixture of steam and $H_2S$.

12. The process of claim 1 provided with the steps in (2) of (i) splitting said hot raw effluent gas mixture from the reaction zone into a first gas stream containing about 85 to 99 volume % of the total hot raw effluent gas stream and less than about 10 wt. % of the entrained molten slag and particulate solids, and a second gas stream comprising the remainder of said hot raw effluent gas stream and the remainder of the molten slag and particulate matter; (ii) passing said first split gas stream from (i) through a fluidized bed of calcium-containing material and carbon-containing material thereby reducing the amount of sulfur-containing gases in the first gas stream by converting a substantial portion of them into calcium-sulfide; and (iii) passing said second split gas stream from (i) through a pool of quench fluid.

13. The process of claim 12 provided with the step of indirectly contacting the gas stream leaving the fluidized bed in (ii) with a cooling fluid in a gas cooler.

14. The process of claim 12 provided with the step of directly contacting the desulfurized raw stream of synthesis gas leaving the fluidized bed in (ii) with a cooling and scrubbing fluid.

15. The process of claim 14 wherein said cooling and scrubbing fluid is a liquid hydrocarbonaceous fuel.

16. The process of claim 14 wherein said cooling and scrubbing fluid is water; any calcium sulfide and iron oxysulfide in said first slit gas stream react with said $H_2O$ to produce supplemental $H_2S$; and introducing the first split gas stream containing said supplemental $H_2S$ into a gas desulfurization zone.

17. The process of claim 12 provided with the steps of regenerating said fluidized bed in (ii) by steam stripping; and desulfurizing the overhead steam stripped gaseous stream comprising $H_2O$, $H_2S$ and COS.

18. The process of claim 12 wherein said fluidized bed in (ii) comprises about 85 to 95 wt. % of a calcium-containing material selected from the group of calcium-compounds consisting of oxides, hydroxide, carbonates, acetate, formate, hydride, nitrate, chloride, and mixtures thereof; and the remainder of said fluidized bed comprises a carbon-containing material selected from the group consisting of carbon, coal, petroleum coke, carbonaceous material that was entrained in the raw effluent gas stream from the reaction zone and mixtures thereof.

19. The process of claim 12 wherein the quench fluid in (iii) is water contained in a quench tank, and the calcium sulfide and iron oxysulfide in said slag reacts with said quench water to produce $H_2S$-containing gas; and passing an $H_2S$-enriched gas stream from said quench tank into a Claus Unit where elemental sulfur is produced.

20. The process of claim 12 wherein prior to step (ii), said first split gas stream is cooled to a temperature in the range of about 1000° F. to 2000° F., by indirect heat exchange.

21. The process of claim 12 wherein the content of $H_2S+COS$ in the desulfurized first split gas stream leaving the fluidized bed in (ii) is less than about 0.05 mole %.

22. The process of claim 1 provided with the steps of passing the hot raw effluent gas stream produced in said reaction zone through said central vertical outlet in the bottom of said reaction zone while simultaneously directing at least one stream of oxidizing gas at said orifice and the hot raw gas stream passing through thereby oxidizing at least a portion of any elemental iron in the molten slag entrained in said hot raw effluent gas stream and/or on the walls of said outlet.

23. The process of claim 22 wherein said oxidizing gas is selected from the group consisting of steam, a free-oxygen containing gas, and mixtures thereof.

24. The process of claim 23 wherein said free-oxygen containing gas is selected from the group consisting of air, oxygen-enriched air i.e. greater than 21 mole % $O_2$, oxygen-enriched nitrogen or $CO_2$ i.e. greater than 1 mole % $O_2$, and substantially pure oxygen i.e. greater than 95 mole % $O_2$.

25. The process of claim 2 wherein coal is the sulfur and silicate-containing solid carbonaceous fuel and said coal is selected from the group consisting of subbituminous, bituminous, anthracite, lignite, and mixtures thereof.

* * * * *